United States Patent
Bake et al.

(10) Patent No.: US 7,830,669 B2
(45) Date of Patent: Nov. 9, 2010

(54) CONTACT BANK

(75) Inventors: Michael Bake, Bochum (DE); Udo Bendig, Schwerte (DE); Klaus Werner Bohle, Bottrop (DE); Wolf-Dieter Fischer, Wuppertal (DE); Achim Halfmann, Wuppertal (DE); Axel Koruschowitz, Haan (DE); Michael Mansholt, Köln (DE); Peter R. Orda, Wuppertal (DE)

(73) Assignee: 3M Innovative Properties Company, St. Paul, MN (US)

(*) Notice: Subject to any disclaimer, the term of this patent is extended or adjusted under 35 U.S.C. 154(b) by 354 days.

(21) Appl. No.: 12/134,614

(22) Filed: Jun. 6, 2008

(65) Prior Publication Data

US 2008/0232576 A1 Sep. 25, 2008

Related U.S. Application Data

(62) Division of application No. 10/506,441, filed as application No. PCT/US03/07692 on Mar. 11, 2003, now abandoned.

(30) Foreign Application Priority Data

Mar. 11, 2002 (DE) .............................. 202 03 911 U (51) Int. Cl.
*H05K 1/18* (2006.01)
(52) U.S. Cl. ........................ 361/778; 361/781; 361/788; 361/796
(58) Field of Classification Search ......... 361/775–782, 361/788, 796–798
See application file for complete search history.

(56) References Cited

U.S. PATENT DOCUMENTS

| 4,208,551 | A |   | 6/1980  | Passarella |
|-----------|---|---|---------|------------|
| 4,255,741 | A |   | 3/1981  | Peterson   |
| 4,451,708 | A |   | 5/1984  | Kemler et al. |
| 4,629,836 | A |   | 12/1986 | Walsworth  |
| 4,633,042 | A | * | 12/1986 | Fields et al. ................ 379/284 |
| 4,653,842 | A |   | 3/1987  | Kirma      |
| 5,010,445 | A | * | 4/1991  | Weinold .................... 361/728 |

(Continued)

FOREIGN PATENT DOCUMENTS

DE          3614063 A1     5/1987

(Continued)

OTHER PUBLICATIONS

"Telecom Report—Digital Switching EWSD System", Siemens NJ710 24; 4th vol. (1981); ISBN 3-8009-3828-6.

*Primary Examiner*—Tuan T Dinh
(74) *Attorney, Agent, or Firm*—Gregg H. Rosenblatt (57) ABSTRACT

A contact bank, which can be terminated, or is terminated, at least one terminal module serving for signal communication and being adapted to allow telecommunications lines to be connected therewith, or at least one supplementary module, of a telecommunications distribution point, which is connected to a terminal module, whereby the contact bank further is mountable or mounted in the telecommunications distribution point, includes: (a) a plurality of tapping contacts directly and permanently electrically connected to the contacts of the module in the terminated condition of said contact bank; (b) a smaller number of outlet contacts than of tapping contacts; (c) a plurality of remote-controllable switches for selectively electrically connecting said outlet contacts to said tapping contacts; and (d) a control device for controlling the plurality of switches.

14 Claims, 5 Drawing Sheets

U.S. PATENT DOCUMENTS

| | | |
|---|---|---|
| 5,500,788 A | 3/1996 | Longueville et al. |
| 6,211,582 B1 | 4/2001 | Reimold et al. |
| 6,421,322 B1 | 7/2002 | Koziy et al. |
| 6,453,014 B1 | 9/2002 | Jacobson et al. |
| 6,493,319 B1 | 12/2002 | Kramarczyk et al. |
| 6,496,381 B1 | 12/2002 | Groeger |
| 6,690,584 B2 * | 2/2004 | Uzuka et al. ............... 361/796 |

FOREIGN PATENT DOCUMENTS

| | | |
|---|---|---|
| DE | 195 19 785 C1 | 8/1996 |
| EP | 0 364 658 | 4/1990 |
| EP | 0 647 071 A1 | 4/1995 |
| EP | 0 706 737 B1 | 4/1996 |
| EP | 0 724 365 A2 | 7/1996 |
| EP | 0 909 102 B1 | 4/1999 |
| EP | 1 081 924 A2 | 3/2001 |
| FR | 2 528 649 | 12/1983 |
| JP | 5-53341 | 7/1993 |
| WO | WO 93/18621 | 9/1993 |
| WO | WO 98/14016 | 4/1998 |
| WO | WO 99/14917 | 3/1999 |
| WO | WO 99/36987 | 7/1999 |
| WO | WO 99/53643 | 10/1999 |
| WO | WO 99/66700 | 12/1999 |
| WO | WO 00/76224 A1 | 12/2000 |
| WO | WO 01/45432 A1 | 6/2001 |
| WO | WO 01/45452 A2 | 6/2001 |
| WO | WO 01/95598 A2 | 12/2001 |
| WO | WO 01/97339 A1 | 12/2001 |
| WO | WO 02/09407 A2 | 1/2002 |

* cited by examiner

CONTACT BANK

CROSS-REFERENCE TO RELATED APPLICATIONS

This application is a divisional of U.S. application Ser. No. 10/506,441, now abandoned filed Mar. 11, 2003, which is a national stage filing under 35 U.S.C. 371 of PCT/US03/07692, filed Mar. 11, 2003, which International Application was published by the International Bureau in English on Sep. 25, 2003, which claims priority to DE Application No. 202 03 911.0, filed Mar. 11, 2002, the disclosures of which are incorporated by their entirety herein.

FIELD OF THE INVENTION

The invention relates to a contact bank, a measurement arrangement including at least one such contact bank, a terminal, isolating or supplementary telecommunications module provided with at least one contact bank or one measurement arrangement and a telecommunications assembly including plural modules.

BACKGROUND OF THE INVENTION

In the field of signal communication in general, more particularly in the telecommunications field, terminal and isolating modules, which often are configured as strips, are employed to connect and partition subscriber lines and to cross-connect these lines. Such modules are terminated at the one side, designated incoming or fixed side, as well as at the other side, designated outgoing or cross-connect side, with the same amount of pairs in each case. There often is a need to carry out measurements for the connection thus established, for example between the telephone connection of a subscriber and the system engineering of a telecommunications network operator. These measurements serve for example to test the connection in general, or to localize any disturbances which may have occurred.

Also in other technical fields, particularly in the electrotechnical field, it is frequently necessary to test or monitor objects. For example, in the field of telecommunications, sometimes it is necessary to obtain test access to the telecommunications line, which runs between the customer or subscriber and the switch or exchange of the telephone company. An extremely high number of these telecommunications lines are distributed between the numerous subscribers and the switch in distribution points. A typical type of distribution point is a main distribution frame in the central office of the telecommunications company. A further example is a network of coaxial cables, which can be used in CATV, for example.

It has hitherto been usual to test a line by plugging a suitable test plug, usually connected to a manual measuring device via test leads, into the particular contacts of a terminal module. In other words, it is required for establishing the connections necessary for testing that someone be present at a distribution point with a manual measuring device.

Generally, the numerous telecommunications lines can be tested by manually connecting a test device with the line to be tested at a point in the line, which is suitable for obtaining test access. However, it is more efficient if a "central" test device is provided. This device can be connected, or connectable with a number of telecommunications lines in a manner to allow test or monitoring access, when this access is desired. For this purpose, so-called star-architectures are known, in which several termination points of the test line can be connected with a test device. For each termination point, a separate line is required.

Furthermore, bus architectures are known, in which a test-bus is provided, which is connected with a plurality of termination points by means of a plurality of stub wires, each associated with one termination point. A termination point is that point at which the stub wire is connected or connectable with a line which is to be tested. At the termination point of a particular stub wire, one or more switches are provided in order to allow the desired testing and monitoring. In particular, the arrangement of switches can allow testing in one direction, i.e. towards the subscriber or the switch, in both of the mentioned directions, or it can allow monitoring of the telecommunications line, i.e. the signal transmitted by the telecommunications line is transmitted to the test device without interrupting the line. By means of appropriately controlling the switches at the connection points, a particular line, which is to be tested, can be connected with the test device.

Apart from manual measuring devices, measurements can also be carried out by systems, which are normally used for transmission purposes. Such systems are already provided with corresponding measuring cards and other devices, such as for example a DSLAM mounted on an ADSL or XDSL splitter. For instance, a measuring card can be integrated in the corresponding system. As an alternative, it is possible to terminate an external measuring device and connect it to the system via a corresponding coupling field. Another alternative is to install the corresponding measuring technique on the card. The measurements to be carried out in this case can be "specific to a particular service", i.e. they are carried out as part of the services rendered by the corresponding system, or they can also be of a general nature for measuring, for example, line interruptions in cases of a failure of the system or the like. These measurements via the system are, however, only possible if this system has already been installed. This means that testing of lines that are not included as a function of the corresponding system is impossible. Thus, it is not possible to test a line as to its functionality prior to the planned installation of a new system.

For example, EP 0 364 658 A2 relates to a distribution point having so-called terminal fields featuring openings into which test plugs can be inserted, among other things. The concerned contacts of the terminal field are tapped by way of suitable contacts at such a test plug, and testing of the line becomes possible due to the connection to a manual measuring device. A similar arrangement is the subject of U.S. Pat. No. 4,629,836.

U.S. Pat. No. 4,208,551 relates to a plug-in card for a line switching system, which can be connected to the switching system and can be extended by a plurality of additional lines.

WO 99/36987 relates to an assembly of telephone connecting strips, which are connected by means of a bus. Switches can be provided in order to connect a selected telecommunications line with a remote control and test device.

SUMMARY OF THE INVENTION

The invention provides an arrangement enabling central and thus considerably simplified testing of a plurality of signal communicating lines.

This is attained by way of a contact bank which might also be designated a coupling field, since it allows one or more measuring systems to be permanently coupled to the contacts of a module. As explained below in more detail, testing of a plurality of signal communicating lines thus becomes possible from one central location without there being a need to perform any particular work at a distribution point, such as the plugging-in or replugging of test plugs.

For this purpose, the contact bank in accordance with the invention can be connected to at least one module which may be configured as a terminal module or supplementary module for signal communication and is connected to at least one terminal module serving for signal communication. Such a supplementary module can be, for instance, an overvoltage protection module connected to a terminal module, more particularly a terminal or disconnecting strip. Both a connection to the terminal or isolating module as such as well as to a supplementary module mounted thereon are conceivable for the contact bank in accordance with the invention. A transmission module is cited as another example of a module which can be connected to the contact bank in accordance with the invention. Moreover, the contact bank can be connected to a splitter assembly or may include such a splitter assembly. It should be noted with regard to a splitter assembly that there is a need in the field of the so-called ADSL technology to "split up" two signals communicated in different frequency ranges. The voice signal is in particular split from a data signal. The data signal is routed, for example, to a DSLAM, and the voice signal is routed to an exchange system. In connection with the terminal module and/or the supplementary module, which is connected to a terminal module, it should be noted that a terminal module is to be construed to the effect that telecommunications lines are connectable therewith. In other words, the module is intended to provide connections for a telecommunications line. In particular, the line can be present in the form of one or more wires or cables, which can be connected with contacts provided in the terminal module. Furthermore, one or more wire or cable can be terminated by a plug, which can be connected with the module.

The contact bank or coupling field has several tapping contacts which are directly and permanently electrically connected to contacts of the module in the terminated condition of the contact bank. In other words, the contact bank in accordance with the invention achieves a permanent electrical connection to the contacts of a module, thereby forming the basis for enabling the concerned lines to be tested directly and immediately, without a test plug having to be specifically applied. Furthermore, the contact bank is mountable or mounted in the vicinity of the module. In other words, the contact bank having the above-mentioned features as well as those described below, is located in a telecommunications distribution point, in particular a main distribution frame. Thus, the contact bank is closely associated with a module, to which wires can be connected. It should also be mentioned that this also applies to the control device described hereinafter, which can be associated with a single or a plurality of modules.

It is furthermore noted that the module, which can be connected, or is connected, to the contact bank in accordance with the invention, is preferably a module situated in a telecommunications distribution point, although the invention is independent of this preferred use. In particular, the contact bank and the module can be situated in a main distribution frame. This establishes test access to numerous subscriber lines at a comparably central location of a telecommunications system.

Not only has the contact bank in accordance with the invention the function of tapping a plurality of contacts, as explained above, but this tapping action is "concentrated" in an advantageous manner to a few outlet contacts which are smaller in number than the tapping contacts. Lastly, the contact bank includes a plurality of remote controllable switches for selectively connecting the outlet contacts to the tapping contacts. It is thus possible to carry out testing by way of the contact bank in accordance with the invention from a central location by using a suitable measuring system, or to trigger testing to be performed by the measuring head on the spot. The switch allows the outlet of the contact bank or coupling field, at which a measuring system integrated in the contact bank is terminated, to be connected to a signal line. It is thus possible to automatically, simultaneously access via remote-control the individual signal lines terminated at the contacts of a terminal module or isolating module. Additionally or as an alternative to such a remote-controlled access, the individual signal lines can also be accessed by parallel ways "on the spot". In other words, it is not only possible to carry out testing from a location which is distanced from the testing system, but it can also be triggered by using systems which are in more or less greater vicinity of the means to be tested, i.e. typically the distributor. These systems can more particularly also be situated within the same room. The decisive advantage consists, however, in that the testing process is carried out via the contact bank so that individual plugs need not be manually relocated. Thus, a measuring or monitoring system is added-on to the signal line, or is permanently coupled to this by way of the remote-controllable switch. It should be noted at this point that the outlet contacts can be connected with one or more testbuses by way of one or more testbus switches. The testbus switches as well as any of the further switches mentioned above and below can be remote-controllable.

The contact bank further includes a control device for controlling a plurality of switches. As noted above, the control device, being a part of the contact bank, is closely associated with one or more modules, and can, particularly, be mounted in the vicinity thereof or even adjacent a module. The tapping contacts of the contact bank can be integrated with the module. The plurality of switches can be integrated with the module so as to allow a number of lines, which run through the module, to be concentrated to the outlet contacts. As an alternative, the module can contain only the tapping contacts, and the plurality of switches as well as the outlet contacts and the control device can be provided outside the module. In particular, a control module including these components can be provided associated with one or more so-called access modules, in which the tapping contacts are provided. Furthermore, a single control device can be associated with one or more contact banks as described hereinafter. Thus, an access and control assembly can be said to be formed by at least one contact bank, which can at least be partially integrated in a telecommunications module, and a control device associated therewith. The control device controls a plurality of switches. The control device, furthermore, forms a part of a hierarchic structure, in which plural connections in plural modules can be addressed for test, monitoring and measurements. In this hierarchic structure, each module, of which the telecommunications lines are to be tested, can comprise one or more control devices for controlling the switches provided in the module. In particular, a single control device can be provided in a module for controlling a plurality of remote-controllable switches. Furthermore, further control devices can be associated with several modules. For example, a single control device can be associated with several modules in order to control the control device of each module.

It is also possible to merely provide two outlet contacts so that only one single line can be tested at a specific point in time. It is, however, possible to measure a plurality of lines by using a suitable multiplexing method. Moreover, the contact bank in accordance with the invention can naturally have several outlets, which allows a plurality of lines to be measured simultaneously. In particular if two lines are measured in combination, it becomes possible to measure in general the side-to-side crosstalk between two lines, more particularly what is called "near-end crosstalk" and "far-end crosstalk".

The contact bank in accordance with the invention forms so-to-speak a permanent bridge between the contacts of a module and a measuring system. The contact bank in accordance with the invention differs from a known test plug at least in that it has a plurality of contacts, preferably in an amount equal to that of the contacts of the module, so as to simultaneously tap all of the contacts of the module. The contact bank in accordance with the invention is furthermore characterized by the possibility to define via remote-control which line is to be tested in each case. It is to be noted with regard to the type of connection between the contact bank in accordance with the invention and the contacts of a module that it is possible here to add-on and "listen in", which does not interfere with a connection. "Listen in" is to be understood in this regard in that a measurement, an efficiency control or monitoring is carried out. It does not mean at all, however, that a line is to be "tapped" in a manner that is illegal in some countries.

In case the terminal module concerned is an isolating module having isolating contacts which can be split, the switching circuit in the contact bank in accordance with the invention may be configured such that the connection is through-switched in the normal condition, and, where necessary, splitting is carried out, thus enabling measurement in both directions. The advantage thus materializes that it is not only no longer required due to the contact bank that a test plug be connected to a line to be tested. It is not necessary either that an isolating plug be inserted. It must be emphasized here that the contact bank permits at least two different types of measurements. Measurements are possible, for one thing, "during service", that is, during operation and during continued communication of signals, with the operation not being influenced hereby. Measurement is also conceivable when these services are not being carried out. This is significant in particular in the case of a failure. It should also be noted that the measurement and testing possibilities provided by the contact bank are particularly important with terminal modules including splitter assemblies. In this regard, reference is made to PCT/EP01/15283 and DE 201 04 605 U1 held by the applicant, the full disclosures of which are incorporated by reference herein, and specifically as regards the provision of at least one splitter assembly.

At least one tapping contact of the contact bank can be connected with a circuit, which includes, firstly, a permanent connection with the tapping contact and, secondly, a single line switch. The permanent connection connects the outlet contact with the line in such a manner as to monitor the line, as described in more detail below. The line switch is connected with the line so as to allow an interruption of the line, which might be necessary in certain situations. It is to be noted that the line consists of one or more wires, which are connected with associated contacts of a telecommunications module, at which the contact bank can be terminated. As will be described in more detail below, the contacts of the telecommunications module can have a parting location, also called a separation point. At such a separation point, the line cannot only be tapped, but rather, the line can be caused to run through the contact bank. Thus, the contact bank can comprise of the mentioned line switch, which can interrupt the line. Both the above-mentioned permanent connection and the line switch can be connected with a mode switch, which is connectable with at least one outlet contact. This connection can be realized via the testbus switch. This circuit allows the following functions to be performed. Firstly, when the line switch is in a state, in which the line is not interrupted, and the mode switch connects the testbus switch with the permanent connection, the outlet contact of the contact bank is connected with the permanent connection. In this situation, the line can be monitored. In other words, the signal transmitted by the line is left uninterrupted. However, this signal is also transmitted to the outlet contact and can, thus, be further transmitted to a test device. Starting from the described situation, when the line switch is switched so as to interrupt the line, the outlet contact is connected with the line in a first direction, i.e. the direction in which the permanent connection is formed. Thus, any tests or measurements can be conducted in this first direction. When the mode switch is switched, it connects the outlet contact with the line switch which is in an interruptive state. Thus, the outlet contact is connected with the line in a second direction. Therefore, test and measurements can be conducted in this direction. The described circuit is highly reliable, as a single switch arranged in the line is sufficient for all required functions. As mentioned, measurements can be conducted in both directions of the line. Furthermore, the line can be monitored without interrupting it. The presence of a single switch in the line is advantageous in that such a switch is generally subject to malfunctions. Thus, when the number of switches is reduced, it improves the reliability of the line, also when measurement in two directions is to be carried out. In other words, a single switch can be used without losing the flexibility of having the possibility of measuring in two directions. In view of known circuits, in which two switches are necessary, the provision of a single line switch provides significant advantages. Furthermore, a line switch generally dampens the transmitted signal. Furthermore, a line switch needs a certain space. Thus, the described circuit employing a single line switch has the advantage of superior dampening and space saving characteristics. As regards the above-described circuit, it is worth mentioning that this circuit does not necessarily have to be combined with the described contact bank. Rather, the circuit alone, including all of the mentioned features thereof, alone or in combination with each other, is to be considered part of the present disclosure. In particular, such a circuit displays the mentioned advantages in any type of test, monitoring or measurement application. Thus, the described circuit can be advantageously used in telecommunications systems, such as in a distribution point, in particular a main distribution frame, and a cable cabinet. Furthermore, any other devices, such as DSLAMs, which can also be located at the subscriber, can employ the described circuit. For example, the described circuit can also be incorporated in a hand-held device, which can be used for testing any type of equipment, such as in the field of telecommunications.

Unnecessary mounting of a number of additional components on one and the same terminal module is prevented by that preferred embodiment in which the contact bank in accordance with the invention includes integrated overvoltage protection means, splitter assemblies or the like. If the circumstances, such as the risk of lightning strike, require an overvoltage protection, it is hereby possible to protect the lines involved as well as the devices connected thereto.

The contact bank in accordance with the invention can as a matter of principle be integrated into a terminal module, an isolating module or an overvoltage protection module, as will be explained in more detail below. It is, however, preferred for supplementing and retrofitting existing equipment, such as telecommunications distribution points, that the contact bank in accordance with the invention be designed in a retrofittable manner so that it can subsequently be connected to one or more of the cited modules.

It has furthermore shown to be of advantage for the contact bank if it has a housing with at least one opening so that the contact bank can be mounted on an existing module which is optionally provided with further components, and can be terminated there. The already existing components can be for instance an overvoltage protection, isolating plugs or similar systems which are no hindrance to mounting the contact bank in that they are received in the one or more openings thereof.

It is particularly preferred in this regard that the contact bank be designed with a practically frame-shaped housing so that it can be mounted on an existing module from the outside by surrounding it, whilst the front side, at which cable conductors have already been terminated or on which the cited additional components have already been mounted, remains freely accessible.

Tests have revealed particularly favorable handling properties for an embodiment in which the contact bank has a partitioned housing so that it can be mounted to, and terminated at, a module without difficulty by connecting the two or more parts. It should be emphasized with regard to the previously explained embodiments that these are embodiments of a contact bank which are generally independent of the cited details of the contact bank in accordance with the invention. In other words, a contact bank which can be retrofitted in any manner and/or is provided with an opening and/or has a frame-shaped housing and/or has a partitioned housing can also produce its advantageous effects if it does not have the configuration as detailed above including remote-controllable switches. The cited embodiments are viewed as a development which is independent of any other features.

It is particularly advantageous for a retrofittable variant of the contact bank in accordance with the invention if it has at least one plug provided with tapping contacts. In this case, a plurality of single plugs, or one or more multiple plugs are provided which can be plugged into accessible portions of the module to be provided with the contact bank. Thereby, the contacts of the module are tapped, and a connection to the outlet contacts of the contact panel is established by way of the connection between the at least one plug and the remainder of the contact bank.

Such a plug can fulfill further functions in an advantageous manner if it contains one or more functional components, such as for example an overvoltage protection. It is thus possible to combine by particularly simple ways protection of the signal lines, or of the devices terminated there, with the possibility of testing the signal lines or measuring therein.

The invention thus includes, as described above, permanently tapping a plurality of contacts of a module and reducing these to a few outlet contacts. Preferably, however, at least one test device is integrated in the contact bank in accordance with the invention. The test device can be a measuring system. The measuring system can be a measuring head. In the following, reference will mainly be made to a measuring system. However, it is to be understood that any type of test, monitoring or measuring device or system can be used. Thus, also when measuring system and/or a measuring head are mentioned below, any type of test, monitoring or measuring device is meant. A compact arrangement, which in the following will be referred to as measurement arrangement, enables thus the remote-controlled and hence considerably simplified measurement of a plurality of connections. In this arrangement, an external power supply supplies power to the measuring means, i.e. in particular a measuring head. Preferably one or more digital signal processors and A-D converters are used for the measuring means. As is familiar to those skilled in the art, such a measuring system can be configured, on the one hand, so as to measure physical parameters only, e.g. voltage or frequency-dependent voltage, it being also possible in this case to measure interfering voltages. A suitable measuring head can, on the other hand, likewise be configured so as to emit specific signals and to subsequently measure the response for obtaining therefrom specific information on the condition or the properties of the line. It is for example required to test a line before using it for communicating signals of a higher frequency than previously. For this purpose a so-called frequency spectrum is established, and it is investigated in which frequency ranges there might be disturbances. In cases of a disturbance, an error analysis can moreover be carried out by the measuring system which is preferably integrated in the contact bank, in particular as to whether a short circuit or ground fault, a reduced insulation, interfering voltages, an interfering spectrum or the like have occurred. It is also possible to carry out fault location by measuring the resistance or by using a measuring device in the form of a time-domain reflectometer (TDR). Integrating the measuring head, which usually has one or more sensors, in the contact bank offers the advantage that particularly accurate measurements are possible as they are usually carried out in a frequency range requiring short "paths" or line lengths between the measuring technology and the line to be measured. It should be noted with regard to the integration of a measuring system in at least one contact bank in accordance with the invention that one single measuring system can be allocated as a decentralized system for a plurality of contact banks, and connection occurs via a suitable bus. The functions of this bus are to control the contact bank, to electrically access the contact bank and to supply power to the latter.

It is economically of advantage if the contact bank in accordance with the invention is integrated in a measuring means, this being, however, "without measuring intelligence" to the extent that evaluation of the measured signals takes place in a remote central unit "with intelligence". For this purpose, the measurement arrangement in accordance with the invention may include a delivery interface in the form of terminal contacts, of a radio interface or an infrared interface. In a configuration in which the measurement arrangement is integrated in a terminal module, an isolating module or overvoltage protection module, the terminal contacts can be for instance contacts of the module, which are reserved on the module for this purpose. A connection with an "evaluation unit" which is separated from the measuring system as such is established via suitable lines terminated at these contacts. It is possible via such a connection, by means of a subscriber line or the cable sheath, that the measuring system communicates with a special measuring stop which is arranged at a distance and is also designated measurement termination. Defined measurements can be carried out via controlled changes of state of the measurement termination.

At least two tapping contacts and/or at least two complete contact banks can be connected with the test device via a connecting structure including at least one testbus. By "connecting structure", it is meant that suitable electrical connections in the form of cables and/or wires, plugs, switches and so on are provided in order to create an electrical connection between the test device and the at least two objects, for example the tapping contacts and/or the contact banks. Those skilled in the art will realize typical types of test devices, which will, generally, be adapted to the type of object to be tested. In the field of telecommunications, the objects to be tested will typically be telecommunications lines. The skilled persons are aware of various types of test devices, particularly test heads, which are suitable for this purpose. It should be noted that the novel connecting structure is generally suitable for the connection of any type of at least two objects, which require testing. The connecting structure is efficient in that a remote test device can be used for testing a plurality of objects which can be arranged at a distance from the "central" test device. In the case of testing telecommunications lines, the remote test device can be connected to several points, at which sections of several lines are connected with other sections at suitable modules or blocks. For example, test access can be provided in the modules or blocks by way of the contact bank. Consequently, in the case of applying the connecting structure for testing telecommunications lines, a plurality of such modules or blocks, and/or suitable access points within the modules or blocks, are connected by way of at least one testbus.

In this context, a testbus is an electrical connection, which runs "along" the objects to be tested. In contrast to a star-architecture, a plurality of objects can be connected with a "central" test device by means of the testbus. It should be mentioned that one or more testbuses can be provided in the connecting structure.

The measurement arrangement can further comprise a communications bus, which can be formed as a fieldbus. It should be noted that the above-mentioned testbus serves to transmit the signals to be tested. The communications bus, in particular a fieldbus is provided in order to transmit control signals to the various control devices. The testbus and the communications bus can be provided in a parallel manner, i.e. with an identical structure. However, they can also have a structure which is different for each of the buses. The term "fieldbus" describes a bus for connecting a plurality of remote connecting points or objects with a central device. Those skilled in the art will be aware of fieldbuses, which are thus also applicable in connection with the invention. For example, the fieldbus can be a CAN bus. As regards the features of the CAN bus, reference is made to ISO 11898. The disclosure of these documents is incorporated herein by reference. The specific features of the CAN bus can be taken from these documents. In connection with the present test and measurement system, the CAN bus has the advantage that it has a comparably simple structure and allows a high number of connections with remote objects. Furthermore, the CAN bus is highly reliable. In particular, it can comprise two symmetrical lines. If one of the lines is interrupted or disturbed, an earthed (grounded) connection is used in order to retain a difference in the potential which allows a signal to be transmitted. Furthermore, a CAN bus has a reliable solution with regard to solving collisions. This describes a situation, in which two remote stations intend to send a signal at the same time. In a CAN bus, as can be taken from the above-referenced documents, provisions are made to organize and handle such a situation. The CAN bus can not only transmit signals which request access to a certain object, such as a particular telecommunications line, but also other data, such as configuration data, confirmations, faulty conditions in one of the stations, etc., can be transmitted by the CAN bus. The operational state of any connected stations as well as of the bus itself can be signalled. Furthermore, software can be downloaded to any of the connected stations. The lower significant bits of the message identifier of the CAN bus can be used to address a particular station. The higher significant bits (see the above-referenced documents) can be used to prioritize the actual message. In a situation, when a maximum number of connected stations is reached, devices are available that can duplicate the information into an extension-bus segment. The CAN bus further allows that the payload data is kept free of addressing bits. At the same time, high priority traffic, e.g. sending the actual messages, can be maintained.

Also a fieldbus selected from the group consisting of a DIN-measurement bus, an interbus-C, a bitbus, an interbus-S, a profibus, a P-NET and an ethernet can be used. As regards an interbus-C and a bitbus, reference is made to IEEE 118. Details regarding an interbus-S can be found in DIN 19258. A profibus is described in DIN 19245. All of the mentioned documents are incorporated herein by reference. It should be mentioned that an ethernet is known for computer systems. As regards the use of an ethernet in combination with an actual metallic access to a telecommunications-subscriber line, this is considered a novel measure and displays advantages with or without the above-described contact bank and/or its connecting structure including a testbus. Generally, a connecting structure of a remote test device and a plurality of objects, such as subscriber lines, tapping contacts, contact banks, telecommunications modules and so on, by way of one of the above-described buses, is considered novel and as such a part of the present disclosure. Thus, such a connecting structure using one or more of the above-mentioned buses can alone be provided in a telecommunications system, in particular in connection with test, monitoring and measurement, and displays those advantages that are mentioned in connection with the connecting structure and the various buses in particular.

The connection between the testbus and the objects to be tested, such as the tapping contacts and/or the contact banks, is provided for each object by way of a stub wire or stub cable. This generally means that a wire or cable is provided, which terminates at that point, where the test or monitoring access to the object to be tested is provided. At this termination point, suitable connections, switches and relays are provided in order to allow the connection of a selected one of the objects, in particular, of the telecommunications lines to be tested, with the remote test device. Whenever a particular line does not have to be tested, the switches and connections at the termination point are controlled in a manner to disconnect that particular point from the testbus. This control is performed at a high level of hierarchy. However, in conventional systems, the stub wire between the termination point and the testbus remains connected with the testbus.

In the novel connecting structure, at least one primary switch is provided for disconnecting at least one stub wire from the testbus. As outlined above, at least two stub wires are provided, each associated with an object to be tested. The stub wire is connected or connectable with the testbus. In conventional systems, this connection remains for all remaining objects, even though another object of the plurality of objects, which are connected with the testbus, is tested. Any such stub wires, which are connected with the testbus, have an influence on the signal, which is transmitted by the testbus. The stub wires essentially act as antennas and take up additional signals from the surroundings. This is particularly critical, when signals with comparably high frequencies are transmitted by the telecommunications lines and are thus also transmitted by the testbus.

The novel connecting structure provides superior results with regard to the quality of the signal, which can be transmitted to the test device. By way of the at least one primary switch, one or more stub wires can be electrically disconnected from the testbus so that deteriorating influences on the signal transmitted by the testbus can be minimized. Whereas the positive effect is obtained with every stub wire, which is disconnected from the testbus, it is preferred that all stub wires, which are present, are disconnectable. In this manner, the signal which is transmitted to the test device, when a particular object is tested, can be kept as free from deteriorating influences as possible. Thus, the electrical connection between the test device and the object to be tested is kept as free from stub wires or cables as possible. In particular, as many electrical connections and sections of cables or wires, which are unnecessary when a particular object is to be tested, are eliminated. The disconnection of unnecessary stub wires can be provided to the extent that only the direct connection between the test device and the object to be tested remains at the time of testing.

It is again to be noted that the switch in the connecting structure, which allows a disconnection of a stub wire, is provided at the lowest level of hierarchy. In other words, there can be additional switches in the stub wire, in further stub wires extending from a first stub wire, as well as at the termination points, where metallic access between the stub wire and the object to be tested, in particular the telecommunications line, is provided. There is the advantage that any stub wires, which would otherwise deteriorate the signal transmitted by the testbus, can be disconnected. This is, as mentioned, independent from higher levels of hierarchy, at which the stub wire as such can be connected with or disconnected from a termination point, in particular the objects to be tested, such as a telecommunications line. In the connecting structure, "dead end" stub wires, which can also be called bridge taps, can advantageously be avoided. Thus, this cause of possible interference affecting the signal transmitted by the testbus can be eliminated.

In the connecting structure, secondary stub wires can electrically be connected or connectable with the stub wire, which is connected with the testbus. As an example, in a telecommunications block having plural telecommunications modules, a primary stub wire extending from the testbus can be provided as a local bus along all modules of the block. Further, secondary stub wires can extend from the primary stub wire. Each of the secondary stub wires can be connected with a particular module. Again, further stub wires can be provided in order to allow metallic access to each of a plurality of contacts within a module. As a further example, plural contact banks can be connected with a remote test device by way of the testbus and plural stub wires. Secondary stub wires can be provided in the contact bank in order to connect plural tapping contacts or plural outlet contacts with the primary stub wire. At suitable connection points, switches can be provided in order to select a particular contact, and thus, a particular telecommunications line which will be connected with the testbus for test and monitoring purposes. It is advantageous with regard to the quality of the signal, which is transmitted to the test device, when also at least one secondary stub wire, which is connected with the primary stub wire, is disconnectable from the primary stub wire by way of a secondary switch.

Positive effects will be obtained, when those portions of stub wires, which remain connected with the testbus, are kept as short as possible. In particular, the switch for disconnecting a particular stub wire can be provided at the connection point of the stub wire with the testbus. In this case, there is literally no portion of the stub wire, which remains connected with the testbus, so that any negative influence on the signal can be avoided.

In order to provide good handling properties, the one or more switches can be remotely controllable. In other words, an automatic system can be provided, in which a control is possible such that a particular object or a telecommunications line is addressed by remotely activating the necessary switches and connecting the desired object with the testbus as well as disconnecting as many stub wires as possible.

Also the above-described connecting structure, including any of the mentioned features, alone or in combination with each other, displays its advantages with or without being combined with the contact bank. In particular, a connecting structure for electrically connecting at least one test device with at least two objects to be tested, including one or more of the above-mentioned features, is to be considered part of the present disclosure.

As regards the connection between the measurement arrangement in any of the above-described embodiments, with an above-mentioned measuring termination, this connection can be prevented in an advantageous manner from being line-conducted by integrating a radio interface (e.g. bluetooth or any other integrated radio technology) or an infrared interface in the measurement arrangement.

As mentioned, the contact bank in accordance with the invention is independent of the module at which it can be terminated, and can in particular be configured in a retrofittable manner. It is, however, preferred for specific applications that the contact bank in accordance with the invention or a measurement arrangement in accordance with the invention, consisting of at least one contact bank and at least one measurement arrangement, be directly integrated in such a module, for example a terminal module, an isolating or a supplementary module, in particular an overvoltage protection magazine. A feature in this is that a module is provided which meets the requirements for carrying out with little effort remote-controllable, selective testing of line connections from a central location.

In this regard, a particularly preferred embodiment consists in the module being an isolating module having isolating contacts with at least one parting location. One single parting location can be sufficient in this case if the measurements via the contact bank are to take place only in one direction, i.e. in the direction of the line or backbone side. However, the possibility materializes in an advantageous manner of effecting measurements both at the line side as well as at the backbone side if two parting locations are provided at the contacts of the module. The contact bank is terminated at the isolating module in such a way that the isolating contacts are through-switched in the normal condition so that there is a normal connection. Using a suitable switching circuit permits splitting of the connection by means of the contact bank in order to carry out the required measurements in both directions.

In connection with at least one parting location or at least one separation point being provided in the module, the above-described circuit for providing a plurality of test, measurement and monitoring functions, can be created. In particular, the parting location can include a line switch. This line switch and the tapping contact of the contact bank can be connected with a mode switch. The mode switch can be connected with the testbus switch, which connects with the testbus. As described above with regard to such a circuit being provided in the contact bank, this circuit allows test and measurements in both directions of the line as well as monitoring the line. These functions including the mentioned advantages can also be obtained for the latter combination of features, in which the line switch is arranged in the module.

It is especially favorable if the contact bank fulfills two functions in that it permits, for one thing, switching to individual lines. The contact bank can, for another, also be integrated with the possibility of ensuring remote-controlled splitting of at least one parting location of the contacts of the module. This is achieved in that at least one parting location can be actuated, in other words split and closed, by way of a remote-controllable switch. The control line for the respective switch can be integrated in the switching and measurement arrangement.

An electronic or electromechanical configuration, such as e.g. in the form of a relay, is preferred for the at least one remote-controllable switch provided for the selective connection between the outlet contacts and tapping contacts. Such switches can be configured in the smallest space possible and can be integrated without difficulty in the contact bank in accordance with the invention. Such an electronical or electromechanical switch can be provided in a contact bank, a measurement arrangement and/or a terminal module in any of the above-mentioned embodiments.

Furthermore, one or more of the switches, which are employed in the contact bank, the measurement arrangement and/or the module, can be formed as a semiconductor device.

The contact bank, the measurement arrangement as well as the module can be employed in a telecommunications assembly. For example, more than one of the above-mentioned devices can be connected with a remote test device by means of the described connections. E.g., the objects to be tested can be a number of telecommunications devices, blocks, modules or individual telecommunications lines. In particular, the telecommunications assembly, with which the contact bank, the measurement arrangement or the terminal module is combined, can be located in a main distribution frame (MDF).

Main distribution frames are located in the central office of the telecommunications company and are thus a typical location at which test, monitoring and measurement access to telecommunications devices and/or individual telecommunications lines is desired. This provides the advantage that one or more centrally located test devices can be provided within an area, which can be easily accessed by the telecommunications company, and thus allows test and monitoring functions to be performed within this area as well as with remote objects.

Also a method of testing a selected one of at least two objects is disclosed. The objects are connected with a test device by means of at least one testbus and at least two stub wires, each associated with a particular object. At a time, when a particular object is to be tested, at least one stub wire, associated with another object, is disconnected from the testbus. As outlined above, this allows the testing of a particular object with the elimination of possible sources for interference, which deteriorate the signal submitted to the test device.

The method can be realized by initially having one or more stub wires disconnected from the testbus. At the time of testing a particular object, the stub wire associated with this object is connected with the testbus.

Furthermore, the described advantages can also be obtained, when the stub wires are initially connected with the testbus, and one or more stub wires, which are associated with objects which are not to be tested at a particular point in time, are disconnected at the time of testing a particular object. In this context, it is to be mentioned that the hierarchy of the connecting structure can be used in order to realize the necessary connections and disconnections. In particular, when a particular object is addressed by the test device, each object, which is located between the addressed object and the test device, will receive a signal, which it can interpret to the effect that it is not addressed. In particular, appropriate components can be provided in order to analyze the signal and thus control a switch to the effect that the stub wire, which is associated with an object that was not addressed, is disconnected. This can also be performed by any of the objects, which are located along the testbus "behind" the addressed module. As an alternative, the stub wire can initially be disconnected from the testbus, and at the time of testing, a switch can be controlled to the effect that only that stub wire, which is associated with the object to be tested, is to be connected with the testbus.

BRIEF DESCRIPTION OF THE DRAWINGS

A few example embodiments of the invention will now be detailed with reference to the drawings in which.

DETAILED DESCRIPTION OF THE INVENTION

Figure 1:
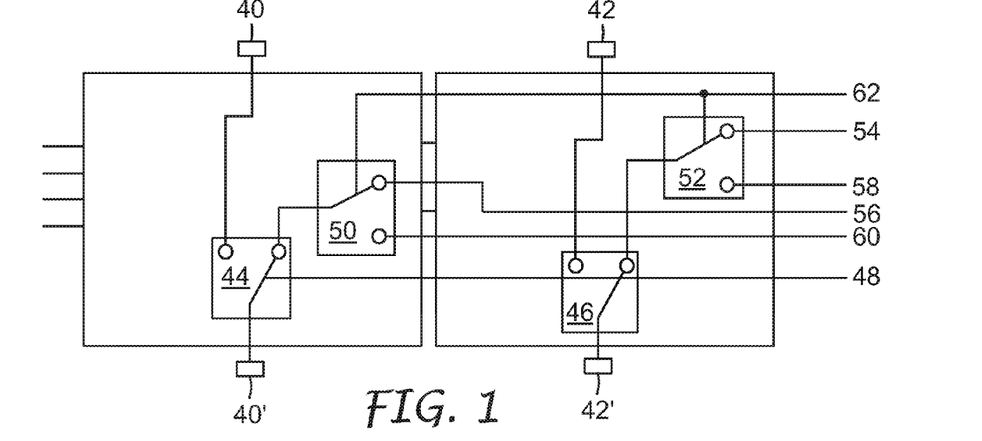
FIG. 1 is a partial view of a switching circuit of a first embodiment of the contact bank.

Referring now to FIG. 1 there is illustrated a part of a switching circuit of the contact bank in accordance with the invention. As cited above, the contact bank can be, or is, terminated at a terminal module having opposite contacts 40, 40' and 42, 42'. In the normal condition, signal communication between the opposite contacts 40, 40' and 42, 42' takes place in that the switches 44 and 46, respectively, are closed so as to connect the opposite contacts. It is to be noted that the Figure illustrates that position of the switch 44, 46 in which a line-side measurement, that is, a measurement in the direction of the contacts 40', 42' facing the lines, can take place in the illustrated switching circuit of a coupling field. In the position of the switch 44, 46, that is not shown, signal communication takes place between the opposite contacts 40, 40' and 42, 42'. The two switches 44, 46 forming a parting location can be remotely controlled in an advantageous manner by a control line 48 which can be integrated in the measurement arrangement connected to the contact bank.

In the illustrated position of the switches 44, 46, the contacts 40', 42' are connected to a testbus via one further respective switch 50, 52, said testbus including four lines in the case illustrated. In the illustrated position of the switches 50, 52, the cited conductors are connected to a testbus which is designated testbus A2/B2 and includes the two lines 54 and 56. When the switches 50, 52 are switched-over from the illustrated position, a connection is established to a so-called testbus A1/B1 which further has the lines 58, 60. The configuration including two separate testbuses constitutes a preferred embodiment. It should, however, be noted that the switches 50, 52 can be omitted if only one testbus is provided. Another variant is conceivable wherein the opposite contacts 40, 40' and 42, 42' do not have a parting location in the form of the switches 44, 46. Rather, the opposite contacts 40, 40' and 42, 42' might be directly and permanently connected to each other. A connection of at least one testbus with the respective contact pair might in this case be achieved by the switch 50, 52. For the sake of completeness, it is to be noted that the two switches 50, 52 can be driven via remote-control by a control line 62.

Figure 2:
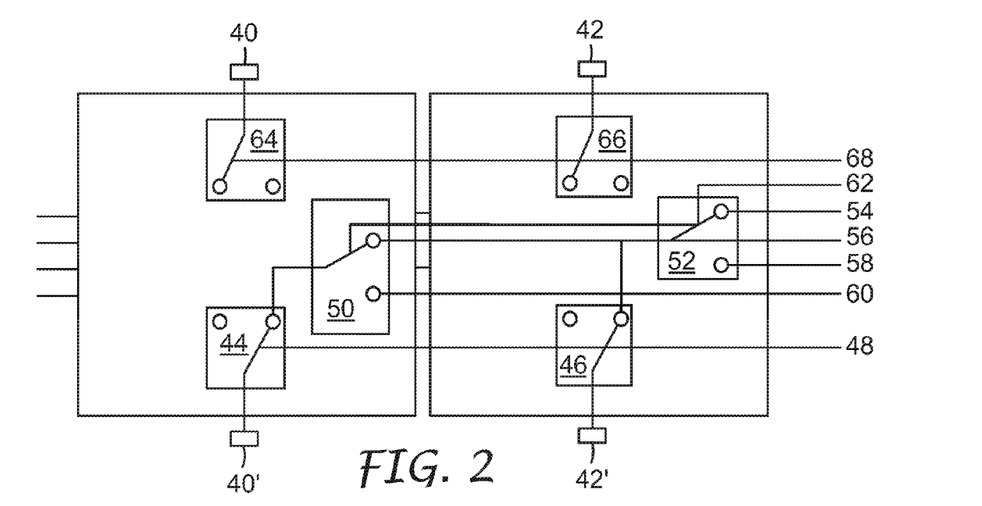
FIG. 2 is a partial view of a switching circuit of a second embodiment of the contact bank.

Referring now to FIG. 2 there is illustrated a second embodiment of the switching circuit of a coupling field in accordance with the invention. The structure including the opposite contacts 40, 40' and 42, 42' of a terminal module, and the configuration of the switches 44, 46, 50 and 52, including the involved control lines 48, 62, are as shown in FIG. 1, and therefore no further explanation thereof is required. The switching circuit illustrated in FIG. 2 allows, however, backbone measurements to be carried out in addition to line-side measurements in accordance with FIG. 1. In other words, it is possible to measure in the direction of the backbone contacts 40, 42. In the preferred embodiment as illustrated, an additional switch 64, 66 is provided in each case, which forms an additional parting location. The two switches 64, 66 can be driven via remote control by means of a control line 68. In accordance with FIG. 1, FIG. 2 illustrates a switching circuit in which the contacts 40', 42' are connected to one of the testbuses. The switches 64, 66, provided in the area of the contacts 40, 42, are switched in such a manner that no connection with a testbus is established. It is, however, also possible to connect these contacts to a testbus by switching over these switches 64, 66 via the control line 68. For the sake of completeness, it is to be noted that all of the shown switches can be configured as mechanical or electronic relays. In the latter case, an integrated switching circuit is likewise conceivable.

Figure 3:
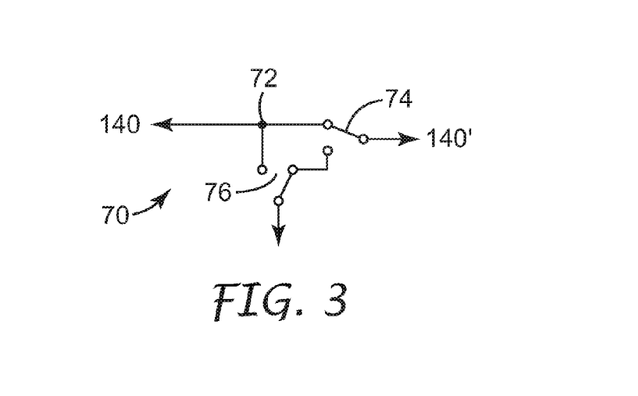
FIG. 3 is a schematic view of a circuit of a third embodiment of the contact bank.

FIG. 3 shows an alternative circuit 70 for providing test and monitoring access to a line between contacts 140 and 140'. Firstly, a permanent connection 72 is formed so as to tap the line. Secondly, a line switch 74 is provided in the line. This line switch 74 allows the line to be interrupted. In the state shown, the line is not interrupted. Both the line switch 74 and the permanent connection 72 are connected with a mode switch 76. As described hereinafter, the mode switch 76 is connected with the testbus switch and allows the modes of testing, monitoring and measurement to be adjusted.

In particular, FIG. 3 shows a situation in which no testing or monitoring is conducted. Rather, the line is in a continuous condition and the mode switch 76 is in a position to interrupt the connection between the testbus switch and the permanent connection 72. When, in the state shown in FIG. 3, the mode switch 76 is switched, the testbus switch is connected with the permanent connection 72. When the testbus switch is in the position to connect a particular circuit 70, as shown in FIG. 3, with the outlet contacts of the contact bank, the line between contacts 140 and 140' can be monitored. In particular, one can "listen in" on the line, e.g., without interrupting the line, the signal, which is transmitted by the line, is additionally transmitted to a test device and can thus be evaluated.

When the line switch 74 is switched in addition to the mode switch 76, the permanent connection 72 is connected with the testbus switch, and the line is interrupted. In such a state, measurement can be carried out in the direction of contact 140. In particular, the line, which continues beyond contact 140, can be tested and measurements can be carried out. This is also possible in the direction of contact 140'. For this purpose, the mode switch 76 must be in the position as shown in FIG. 3. Furthermore, the line switch 74 must be switched so as to connect the testbus switch, which is connected with the mode switch 76, with the line in direction of contact 140'. In this situation, the line can be tested in this direction, and suitable measurements can be carried out.

Figure 4:
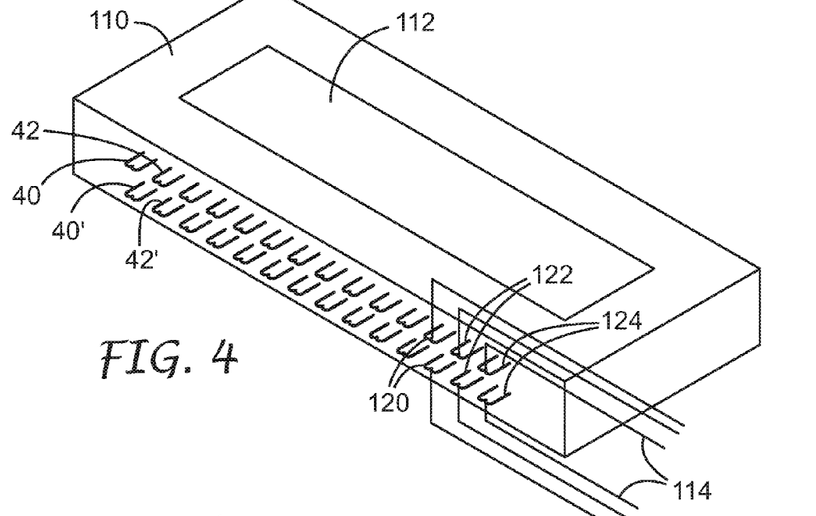
FIG. 4 is a diagrammatic illustration of a strip-type terminal module including a contact bank.

FIG. 4 shows a terminal module in the form of a terminal strip 110 having integrated the contact bank 112 in accordance with the invention, which includes a suitable housing portion or a housing. As explained, the tapping contacts of the contact bank 112 tap the contacts of the terminal strip 110 permanently and directly. The contacts 40, 40' as well as 42, 42', etc., which are accessible at the front side for terminating cable cores, are indicated in the Figure. The illustrated embodiment is moreover that preferred variant in which a measuring head is integrated in the contact bank 112. To achieve a connection between the measuring head and a remote central unit for evaluating the measurement results, at least two contacts of the terminal strip 110 are reserved in the illustrated first embodiment, so that lines 114 can be terminated for connection to a central office. The contacts which are provided for termination by lines leading to a central office can, on the one hand, be formed by already existing contacts of the terminal strip 110. As an alternative, it is also conceivable that one or more pairs of additional contacts are provided. A contact pair 120 can serve for example for power supply. Another contact pair 122 may be provided for data connection. Furthermore, a third, reserved or additional, contact pair 124 can be provided so as to ensure the flow of data in both directions. In this case, the contact bank is situated on top of the illustrated system along with the measuring head. In accordance therewith, the central office supplies control commands. The corresponding measuring data is communicated on the way back. This is preferably achieved via separate lines.

Figure 5:
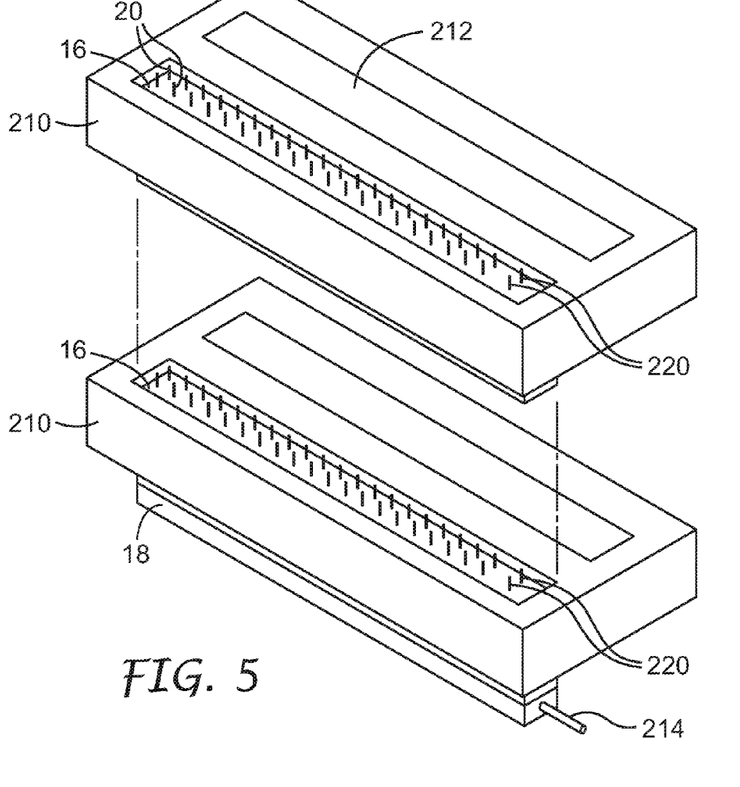
FIG. 5 shows a strip-type terminal module including a contact bank in a second embodiment.

The second embodiment according to FIG. 5 differs herefrom in that a data plug connector 16 is provided on the terminal strip 210, via which a plurality of terminal strips 210 are interconnected. The connector 16 can contain the control device described above. For the interconnection of a plurality of terminal strips 210, the data plug connector 16 in the example shown is provided at the upper side with contact pins 20. For example, ten pairs of contact pins 20 may be provided for a connection with a terminal strip situated thereabove. The additional pairs of contact pins 220, which may be somewhat detached from the remaining contact pins, provide power as well as data transmission. Further pairs of contact pins may be provided for the required control lines. The underside of the terminal strip 210 may moreover also be terminated by a suitable connector 18 which, as is shown in FIG. 5, establishes a data connection to a central office via a line 214. It is to be noted that a radio or infrared interface may be provided on the contact bank in accordance with the invention in order to prevent a line-conducted connection to a central unit in accordance with FIGS. 4 and 5. As can be seen from the Figure, the data plug connectors 16 can be provided such that a plurality of juxtaposed terminal strips 210 are interconnected. As an example, the contact pins 20 as indicated in the Figure may be situated at the upper side of the terminal strip 210. In accordance therewith, the underside of each terminal strip 210 is provided with sockets suitable for receiving the contact pins 20. The terminal strips are interconnected by the data plug connectors 16. It is to be noted that the number of contact pins 20 need not be the same as the number of the contacts of the terminal strips. Rather, the contacts 20 of the data plug connector 16 are components of the different possible testbuses. The contacts 220 are moreover required for power supply and for the necessary control lines. In the illustrated embodiment, the additional connector 18 containing the required lines 214 leading to the central system, or containing the communicating mechanism, is terminated at the underside. As an alternative, the measuring head in the embodiment as illustrated in FIG. 5 must not necessarily be integrated in the respective terminal strip 210. It may rather also be situated for example in the connector 18 or in the vicinity thereof as a central measuring head.

Figure 6:
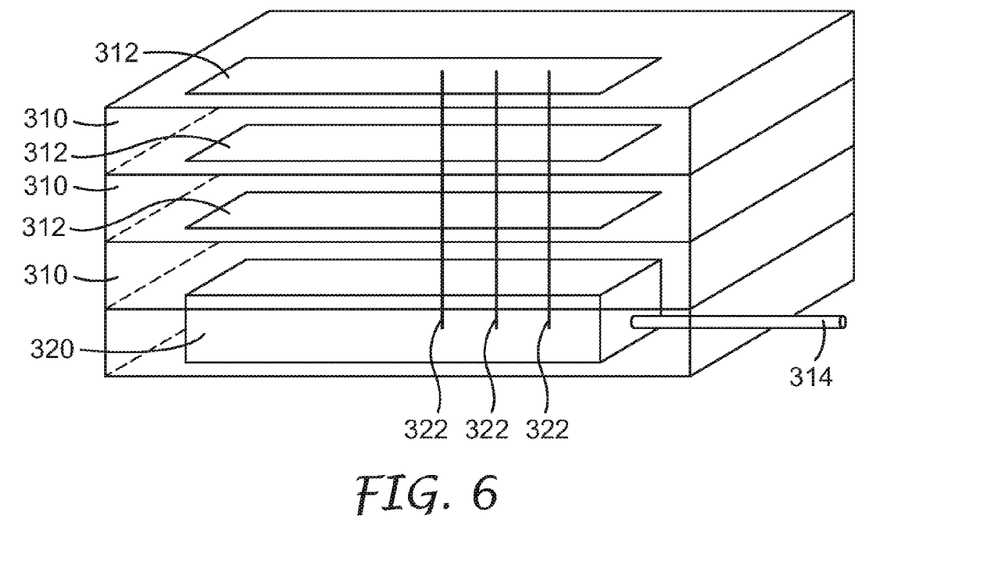
FIG. 6 is a diagrammatic illustration of a plurality of strip-type terminal modules including the contact bank in a third embodiment.

In the embodiment as shown in FIG. 6, each of the plurality of illustrated terminal strips 310 is provided with a contact bank 312 none of which has an integrated measuring head. Rather, a measuring head 320 allocated to a plurality of terminal strips 310 is connected to the individual contact banks 312 via one bus 322 in each case. In other words, the number of busses provided corresponds to that of the contact banks 312. The bus in a so-called "backplane" at which the individual contact banks 312 are terminated may be configured as a flexible cable, as a plug integrated in the respective terminal strip 310, as a circuit board, or in any other manner. The measuring technology, which is so-to-speak centrally allocated to a plurality of terminal strips 310, is configured in this embodiment as a supplementary module which can be integrated, instead of one or more terminal strips, in a terminal block having a plurality of terminal strips. This variant offers the advantage that the given dimensions of the block can be maintained. It is, however, just as conceivable to mount the module containing the measuring head 320 on the block in addition to the terminal strips 310 thereof, thus increasing at least one of the dimensions of the block. The connection of a central unit with the measuring head 320 can be achieved in the embodiment as shown in FIG. 6 by providing either the measure according to FIGS. 4 and 5 (line 314), or an infrared or radio interface. In the previously described embodiment as well as in further embodiments, the contact bank 312 may be contained in the measuring head 320. Alternatively, the measuring head 320 may be situated in front of the contact bank 312 or at any other location in the vicinity of the system concerned. The measuring head 320 can further contain the control device of the contact bank. This also applies to the measuring head 420 described below.

Figure 7:
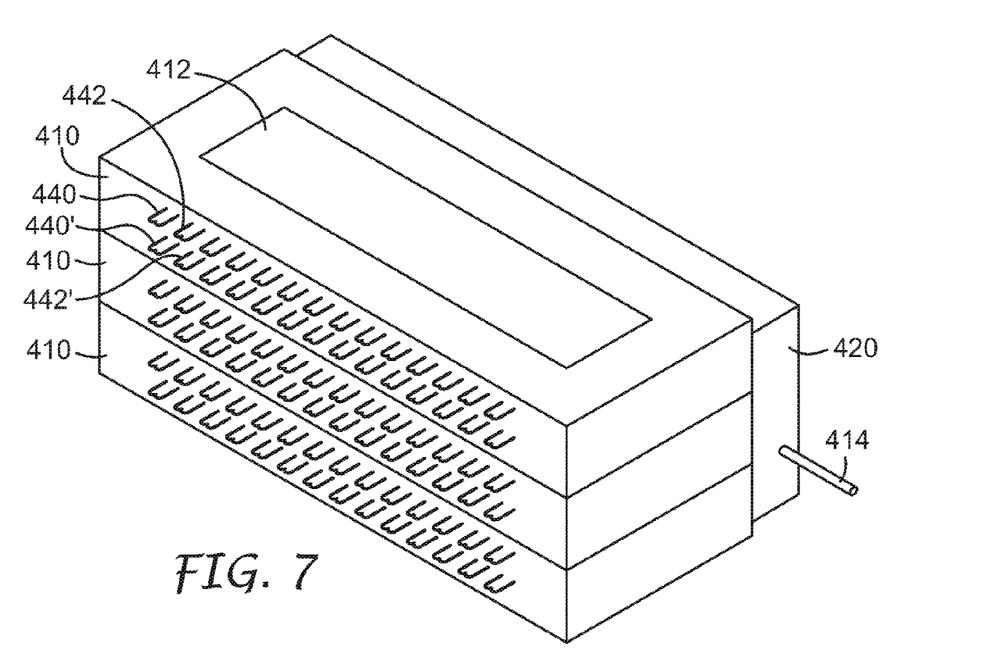
FIG. 7 is a diagrammatic view of a plurality of terminal modules including the contact bank in a fourth embodiment.

In the embodiment according to FIG. 7, one single, schematically indicated measuring head is likewise allocated to a plurality of contact banks 412. However, in this case, the measuring head 420 is disposed on a backplane which may be integrated in a block of several terminal strips 410. It is possible due to such an integration to maintain the depth of the block. As an alternative, the backplane can be subsequently mounted on the rear side of a block, which usually increases the overall depth. FIG. 7 moreover shows the contact pairs 440, 440' and 442, 442' at the front side. In the case illustrated, the so-called "backplane" includes an outgoing data line 414. The data communication can, however, be carried out in any manner, for example by using infrared or radio signals. The contact bank or coupling field can in this embodiment be configured, on the one hand, as a central coupling field on the backplane from which the contacts of a plurality of terminal strips are tapped. As an alternative, a plurality of decentralized coupling fields may be provided which are each situated in a terminal strip 410. It is to be noted that the aforementioned variants can also be used in this embodiment for connection with a central office. It is moreover achievable in this arrangement by particularly simple ways to extend the allocation of the central measuring head to additional terminal strips or terminal blocks via a suitable bus as well as by using central or decentralized contact banks. It is furthermore evident from that stated above that the contact bank in accordance with the invention may be configured in each case so as to be suitable for both the exchange of existing connection technology for connecting technology including an integrated contact bank, as well as for retrofitting and supplementing existing connection technology.

Figure 8:
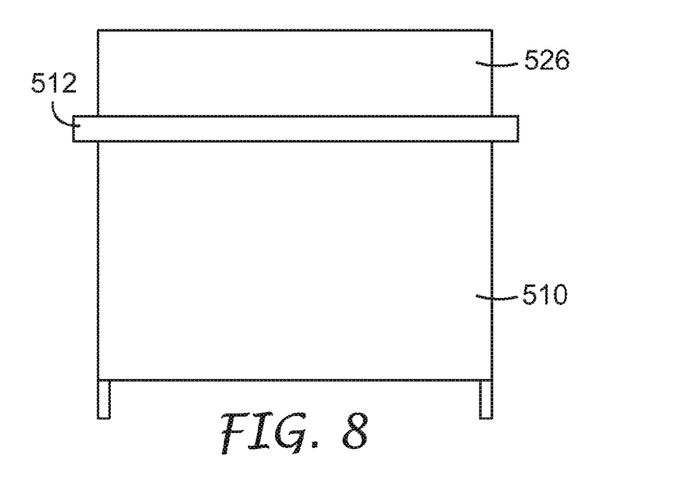
FIG. 8 is a lateral view of a strip-type terminal module including a contact bank in a fifth embodiment.

A variant of a contact bank 512, which is particularly suitable for retrofitting, is illustrated in FIG. 8. The contact bank 512 is, as also becomes clear from FIG. 9, configured practically frame-like with a large central opening 524, so that it may be mounted by surrounding a terminal strip 510. This also rules out the risk of mutual interference with additional components which may be mounted on the terminal strip 510, for example in the form of the overvoltage protection module 526.

Figure 9:
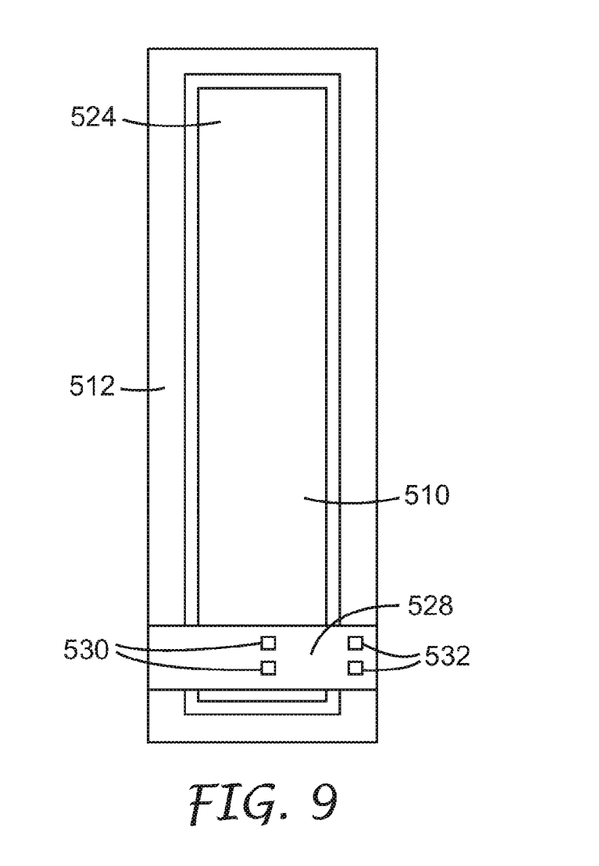
FIG. 9 is a plan view of the contact bank according to FIG. 8.

As is evident from FIG. 9, it is possible with no problem to access that area of the terminal strip 510 in which the contacts are exposed, whilst overvoltage protection modules, isolating plugs and the like may remain there or can be subsequently mounted. It is to be noted that details of the terminal strip 510 are not shown. In a particularly advantageous manner, the frame-like shape of the contact bank 512 enlarges the area in which it is possible to access the contacts of the terminal strip 510. In other words, the user is no longer limited to the spatially restricted area of the terminal strip 10 forming the outline thereof. This is indicated in FIG. 9 in that tapping of the contacts 530 of the terminal strip 510 takes place by means of the illustrated simple plug 528 provided in the case illustrated for tapping two contacts, with the corresponding contacts 532 of the contact bank being situated outside the outlines of the terminal strip 510. For example, the contacts 530 and 532 are connected to each other by way of strip conductors or similar things, thereby establishing a connection between the contacts 530 of the terminal strip 510 and the contacts 532 of the contact bank. It is further to be noted that the indicated plug 528 can also be provided as a multiple plug for tapping a plurality of contact pairs 530, or that the contact bank 512 in accordance with the invention includes a plurality of the simple plugs 528 illustrated. This plug 528 may be an isolating plug which splits parting locations between opposite contacts in thus achieving essentially the constellation as illustrated in FIGS. 1 and 2 in which the switches 44, 46, 64, 66 are provided. That embodiment of the contact bank in accordance with the invention which includes such plugs offers the advantage of permitting the combination of a part of the contact field, which is configured as is standard practice, with suitable plugs which may be adapted to the respective connection technology and the design of the terminal or isolating modules used. It is also true for the last described embodiment that a measuring head may be integrated in the contact bank 512. It can also be configured so that it can be latch-mounted on the contact bank 512.

Figure 10:
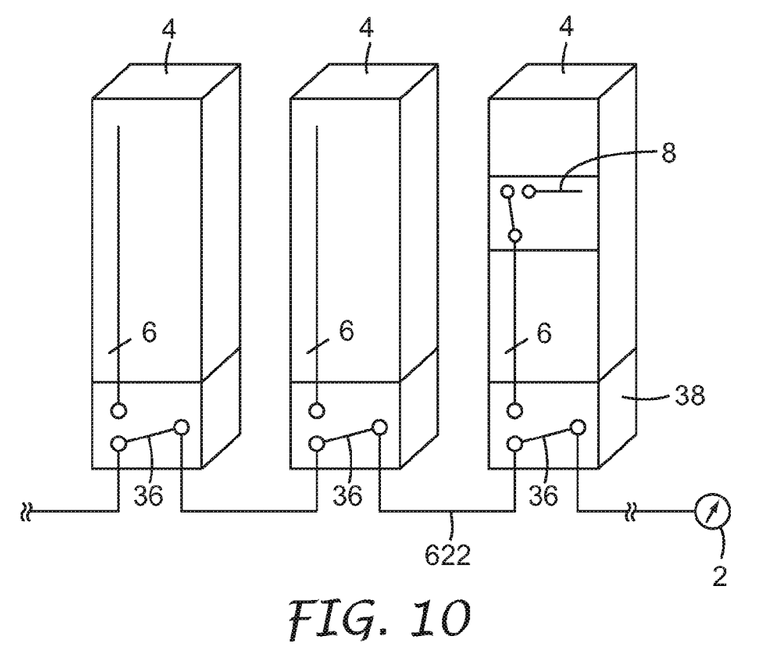
FIG. 10 is a schematic view of a connecting structure.

FIG. 10 shows in a schematic representation, a connecting structure between a test device 2 and a number of remote objects 4, such as telecommunications modules or blocks. These telecommunications blocks are referred to as remote objects hereinafter. In the example situation shown, a test device 2 is connected with a number of remote objects 4 by means of firstly, a testbus 622 and, secondly, a stub wire 6 for each object 4. As mentioned above, additional, secondary stub wires, one of which is shown at 8, can be connected with each stub wire 6 and disconnectable therefrom by way of secondary switch 34 and can be arranged within one or more object 4.

In the case shown, each of the three objects 4 has a switch 36 which renders each associated stub wire 6 connectable with or disconnectable from the testbus 622. The testbus 622 "runs along" all objects 4 and allows testing of the object 4 or any device contained therein or a telecommunications line running therethrough by connecting the stub wire 6 associated with the particular object with the testbus 622 by means of the switch 36.

At the time of testing, as many stub wires of objects, which are not to be tested, are or remain disconnected from the testbus 622 in order to minimize the possible causes for interference and external influences acting on the signal transmitted by the testbus 622. The objects 4 can be blocks in the field of telecommunications which contain a number of modules, which are, in the depicted case, stacked on top of each other. It is generally possible that further stub wires, such as 8 extend from the stub wires 6 shown in the drawing and are thus associated with the individual module. Thereby, the contacts within a particular module and/or the telecommunications lines connected with the individual contacts can individually be tested. It should be noted that more than one secondary stub wire, such as the stub wire denoted with reference numeral 8, can be connected with the primary stub wire 6. Each of the secondary stub wires can be disconnectable from the primary stub wire. This structure of a primary stub wire and at least two secondary stub wires 8 realizes a feature of the invention, since the primary stub wire 6 can be considered a bus running along several objects, and the secondary stub wires are each connected with the primary stub wire 6 and associated with the particular object. Thus, the testbus in the sense of the invention can also be a stub wire connected to a further testbus.

In the case shown, at the lower part of each object 4, a section 38 is provided which accommodates the switch 36 and can be provided as a module controlling the testing and monitoring as well as any other functions performed in connection with the modules of the object 4, in particular a telecommunications block.

The primary stub wires 6 and/or the secondary stub wires 8 can be connected with a line to be tested and/or the contacts, at which sections of the line are connected, in the following manner. The circuits shown in FIG. 1 to 3 are suitable for this purpose. In particular, the lines 54, 56, 58 and 60, which are indicated in FIGS. 1 and 2, can be connected with respective stub wires 6 or 8. Furthermore, the stub wires 6 or 8 as such can constitute the mentioned lines 54, 56, 58 and 60. Furthermore, as regards FIG. 3, a stub wire 6 or 8 can be connected with the mode switch 76 or with the outlet contact of the contact bank, which has a connection with the mode switch 76.

Figure 11:
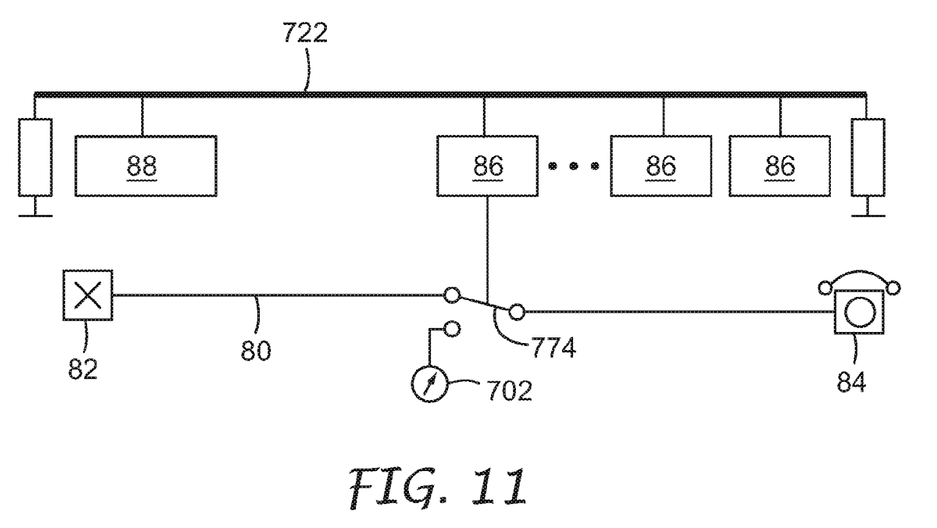
FIG. 11 is a schematic view of the bus structure including a CAN bus.

FIG. 11 schematically shows the structure including a bus 722 and a line 80 which can be tested by means of a test device 702. The line runs between the switch or exchange 82 and the subscriber 84. It is indicated by a line switch 774 that the line 80 can be interrupted so as to allow monitoring and testing thereof. However, it is to be understood that a circuit, such as shown in one of FIGS. 1 to 3, can be provided in connection with the line 80. Details are omitted in FIG. 11 as it mainly serves to show the bus structure.

The bus 722, which can be a CAN-bus, runs along a number of control modules 86. Each of these control modules 86 can be associated with, e.g. a line 80 to be tested. The bus 722 connects all of the control modules with a so-called management interface unit 88. Thus, the management interface unit 88 can communicate with either of the control modules 86 and vice versa. In particular, as described above, the specifications of a CAN-bus or another fieldbus or an ethernet allow the necessary communication and include, as specified above, provisions for solving collisions. Thus, the bus structure, schematically shown in the figure, suitably organizes communication, also in connection with one or more of the above-described contact banks and/or measurement arrangements and/or telecommunications modules.

Although various aspects of the invention have been described with reference to specific embodiments, those aspects of the invention may be practiced in various manners known to one of skill in the art based on the present disclosure.

We claim:

1. An assembly, comprising:
   at least one terminal module serving for signal communication and adapted to allow telecommunications lines to be connected therewith;
   at least one supplementary module, connected to the terminal module and at least one contact bank terminated at one of the terminal module and the supplementary module, the assembly being mounted in a telecommunications distribution point, wherein said contact bank comprises:
   a plurality of tapping contacts directly and permanently electrically connected to contacts of the terminal module in the terminated condition of said contact bank,
   a plurality of outlet contacts, wherein there are a smaller number of outlet contacts than of tapping contacts,
   a plurality of remote-controllable switches for selectively electrically connecting said outlet contacts to said tapping contacts,
   a control device for controlling the plurality of switches, and
   wherein at least one tapping contact is connected with a circuit including a permanent connection with the tapping contact and a line switch, both the permanent connection and the line switch being connected with a mode switch, the mode switch being connectable with at least one outlet contact.

2. The assembly as set forth in claim 1, wherein the contact bank includes at least one overvoltage protection component.

3. The assembly as set forth in claim 1, wherein the contact bank includes at least one splitter assembly.

4. The assembly as set forth in claim 1, wherein the contact bank is configured in a retrofittable manner.

5. The assembly as set forth in claim 1, wherein the contact bank includes a housing with at least one opening.

6. The assembly as set forth in claim 1, wherein the contact bank includes at least one plug having tapping contacts.

7. The assembly as set forth in claim 1, further comprising at least one test device connected to the contact bank.

8. The assembly as set forth in claim 1, wherein the terminal module includes isolating contacts having at least one parting location.

9. The assembly as set forth in claim 5, wherein the housing comprises a frame-shaped housing.

10. The assembly as set forth in claim 5, wherein the housing comprises a partitioned housing.

11. The assembly as set forth in claim 6, wherein said at least one plug further includes at least one overvoltage protection component.

12. The assembly as set forth in claim 8, wherein the at least one parting location includes a line switch, the line switch and the tapping contact of the contact hank being connected with a mode switch, the mode switch being connectable with at least one outlet contact.

13. The assembly as set forth in claim 8, wherein at least one of said parting locations is actuated by a remote-controllable switch.

14. A measurement assembly, comprising:
   at least one terminated contact bank, said contact bank further being mountable in a telecommunications distribution point;

at least one terminal module serving for signal communication and adapted to allow telecommunications lines to be connected therewith;

a plurality of tapping contacts directly and permanently electrically connected to contacts of the terminated module in the terminated condition of said contact bank, a plurality of outlet contacts of a smaller number than of the tapping contacts, a plurality of remote-controllable switches for selectively electrically connecting said outlet contacts to said tapping contacts, a control device for controlling the plurality of switches, wherein at least two tapping contacts and/or at least two contact banks are connected with a test device via a connecting structure including at least one testbus, and wherein the at least one testbus is connected with one of the tapping contacts and the contact banks by at least two stub wires, each being associated with one of a tapping contact and a contact bank to be tested and electrically connectable with the at least one testbus; and at least one primary switch adapted to disconnect at least one of the stub wires from the at least one testbus.

* * * * *

UNITED STATES PATENT AND TRADEMARK OFFICE
CERTIFICATE OF CORRECTION

| | | |
|---|---|---|
| PATENT NO. | : 7,830,669 B2 | Page 1 of 1 |
| APPLICATION NO. | : 12/134614 | |
| DATED | : November 9, 2010 | |
| INVENTOR(S) | : Michael Bake | |

It is certified that error appears in the above-identified patent and that said Letters Patent is hereby corrected as shown below:

Title Page, Item [57], ABSTRACT,
Line 2, before "least" insert -- at --.
Line 4, delete "at least" and insert in place thereof -- at at least --.

Column 10,
Line 6, delete "118" and insert in place thereof -- 1118 --.

Column 20, claim 12
Line 58, delete "hank" and insert in place thereof -- bank --.

Signed and Sealed this
Twelfth Day of April, 2011

David J. Kappos
*Director of the United States Patent and Trademark Office*